WRITING CIRCUIT (WC)

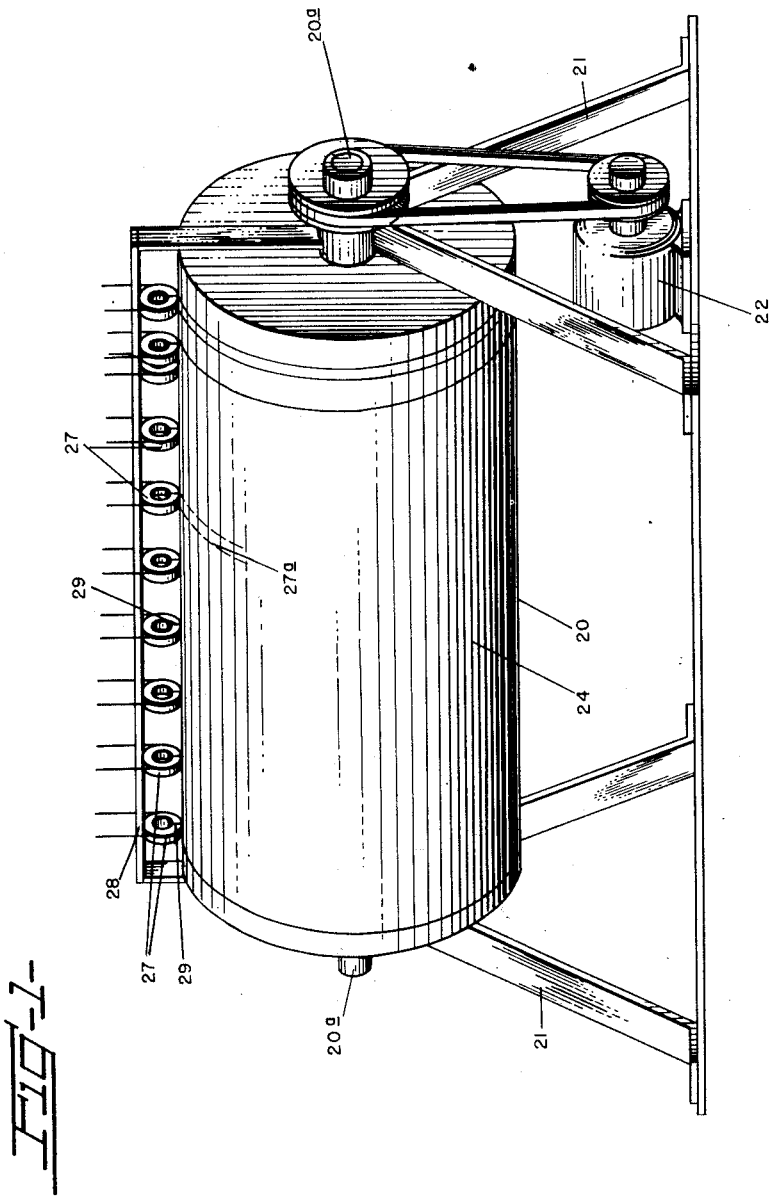

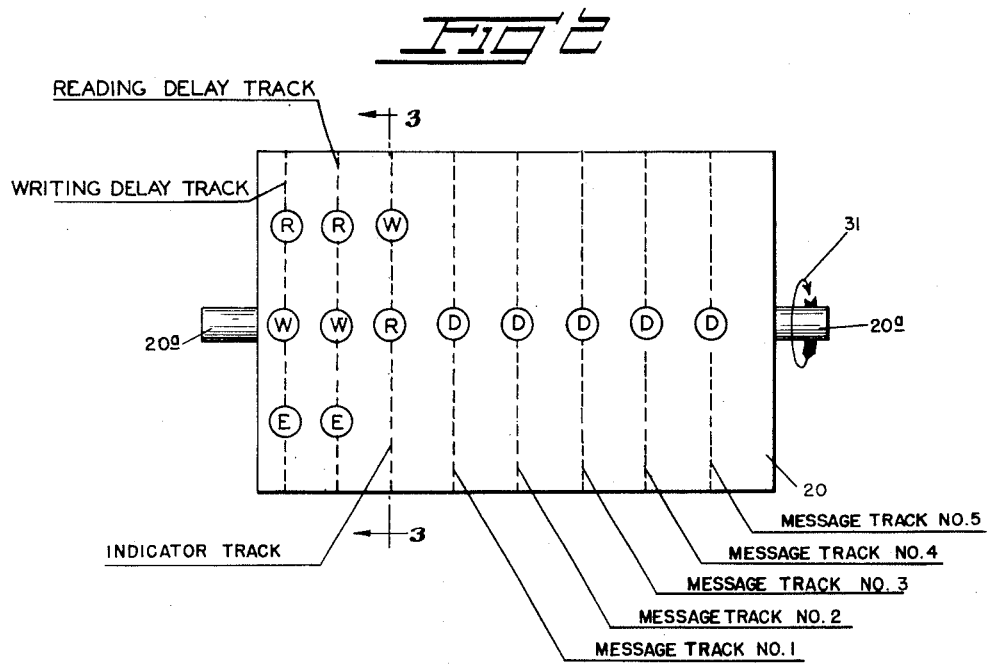
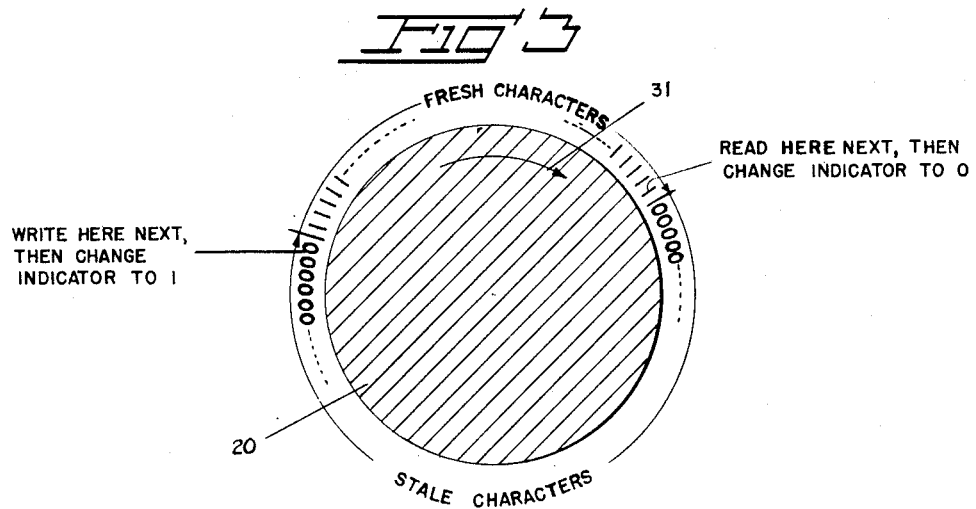

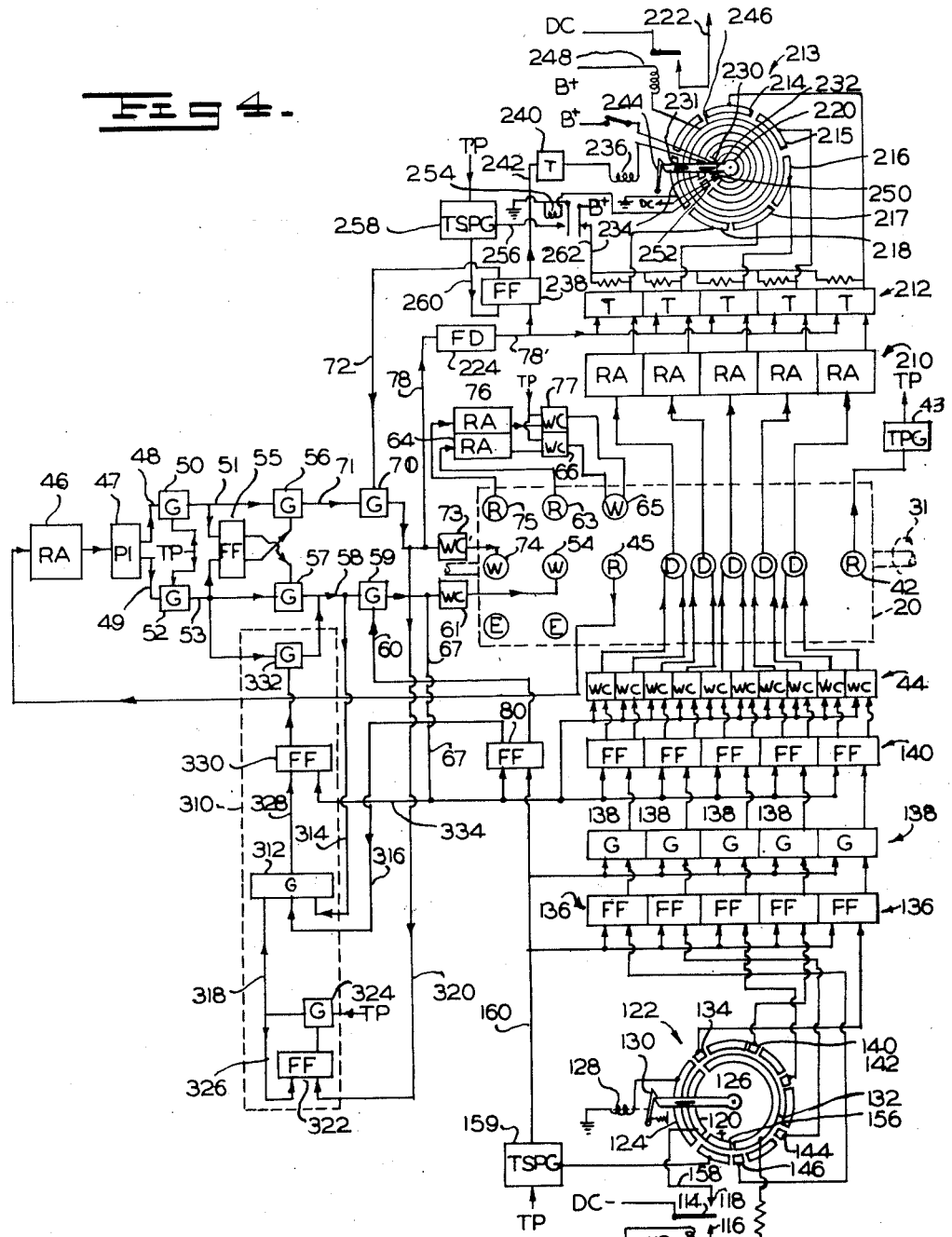

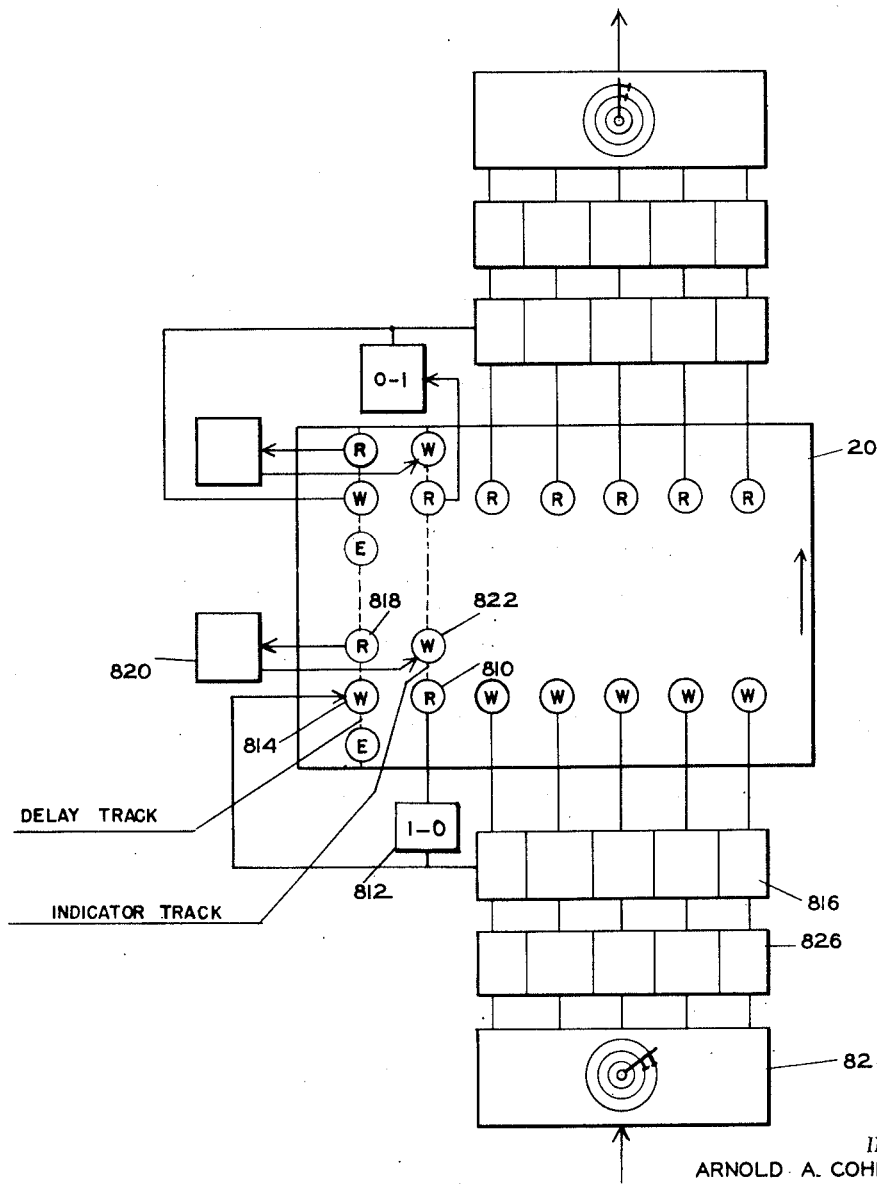

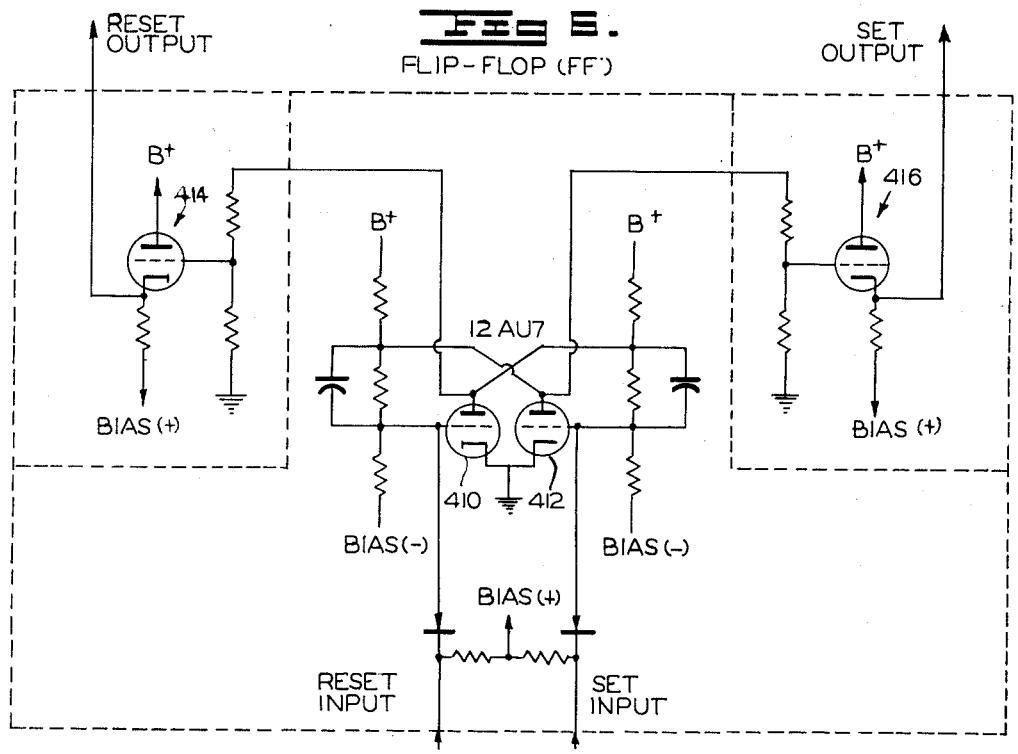
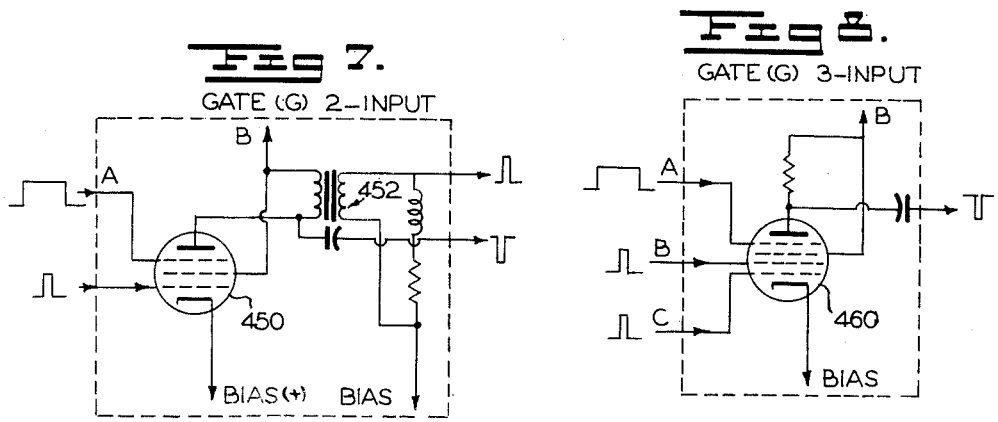

FIXED DELAY (FD)

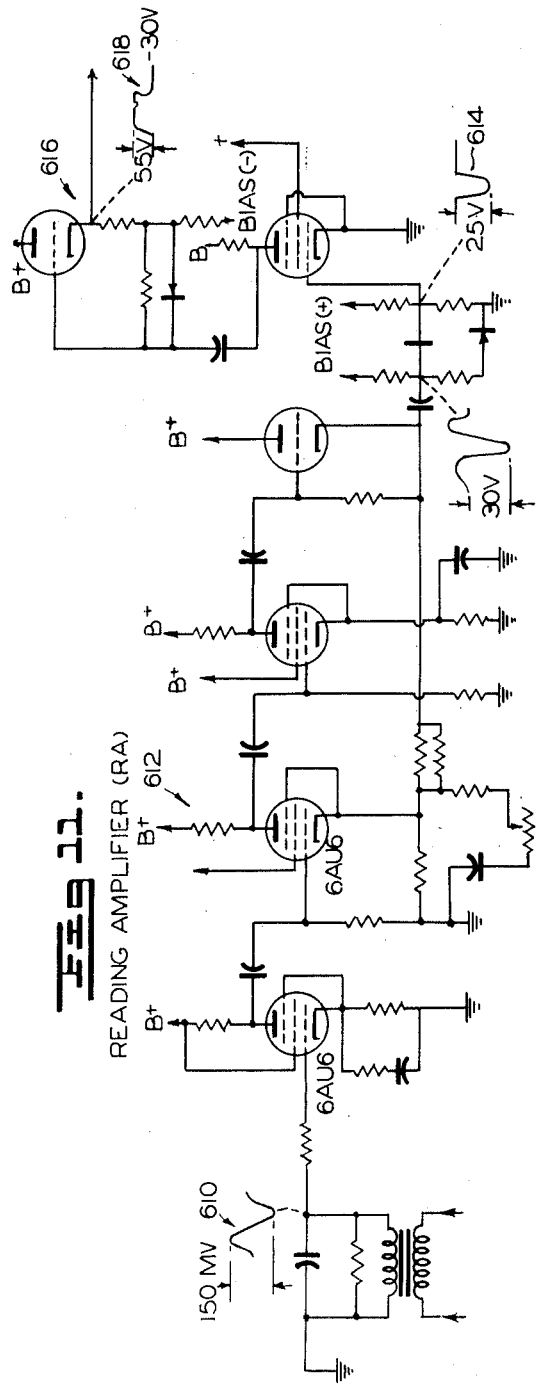
Fig 11. READING AMPLIFIER (RA)
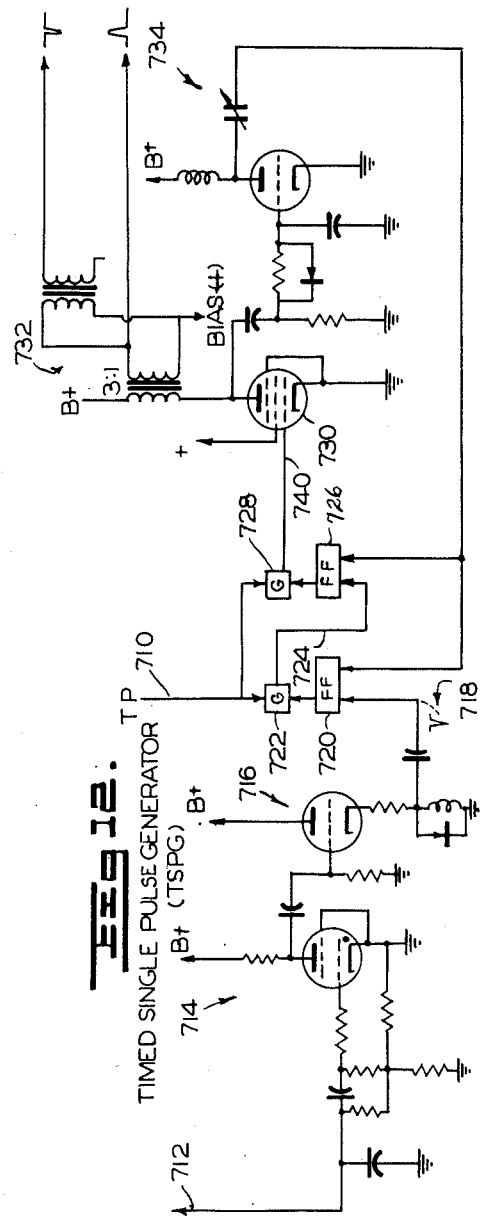
Fig 12. TIMED SINGLE PULSE GENERATOR (TSPG)
INVENTOR
ARNOLD A. COHEN
JOHN L. HILL
ROBERT M. KALB
BY Cushman, Darby & Cushman
ATTORNEY Patented Oct. 14, 1952

2,614,169

UNITED STATES PATENT OFFICE 2,614,169

STORAGE AND RELAY SYSTEM

Arnold A. Cohen, Minneapolis, John L. Hill, North St. Paul, and Robert M. Kalb, Minneapolis, Minn., assignors to Engineering Research Associates, Inc., Arlington, Va., a corporation of Minnesota Application July 24, 1950, Serial No. 175,832

18 Claims. (Cl. 178—17.5)

This invention relates to methods and apparatus for storing and relaying information or the like.

In copending application, Serial No. 16,998, filed March 25, 1948, by A. A. Cohen et al., there is described apparatus for recording magnetic spots or cells on the surface of an elongated magnetizable member which is adapted to be moved continuously in relation to various magnetic transducing heads. In the particular embodiment there disclosed, the magnetizable surface is in the form of magnetic tape which is wrapped tightly about the periphery of a rotatable drum. In that application, it is described not only how so-called binary magnetic spots, that is, spots having flux oriented in one of two possible directions, may be recorded upon and removed from the message or intelligence tracks of the drum, but it is also explained how additional tracks may be employed to locate specific spots or cells in the intelligence tracks as the drum rotates.

The invention which is described in this specification is based upon the magnetizable drum techniques described in the above-cited application, this present invention, however, relating to yet other techniques for recording and/or removing information from specified cells on intelligence tracks by doing so automatically in sequence, in what may be termed asynchronous operation.

In greater detail, the techniques described in connection with the present invention disclose how binary information may be automatically placed in successive cells along the length of a magnetizable member. Our invention also embraces and this disclosure demonstrates how our basic arrangement for automatically utilizing successive cells may be incorporated into a relaying system, as for example, a telegraphic relay station, wherein if necessary information may be stored for extended periods of time. The invention will obviously have many other applications beyond telegraph relaying, and these aplications will become apparent as our description proceeds.

It is therefore an object of our invention to provide methods and apparatus for readily locating selected areas on an elongated record member.

It is a further object of our invention to provide methods and apparatus for readily locating successive areas on an elongated record member.

It is a further object of our invention to provide methods and apparatus for readily locating successive areas in magnetizable tracks on the surface of a rotatable drum.

It is a further object of our invention to provide methods and apparatus for the storage of incoming signals in sequence and to provide for the transmission of these signals in the incoming sequence.

It is a further object of this invention to provide a relaying means which does not depend for its operation upon the expenditure of consumable items, such as paper tape.

It is a further object of this invention to provide a storage medium for message relay applications, which medium will be reusable repeatedly without any major effort to erase old messages or otherwise to return the medium to its unlocated condition.

It is a further object of this invention to provide a storage medium which is substantially permanent for at least the time required to relay a message, but which may be effectively erased and reused when desired.

Further objects and the entire scope of this invention will become more fully apparent from the following detailed description and from the appended claims. It will be understood that the detailed description is for purposes of illustration and is not intended to limit the scope of the invention.

The most complete understanding of the illustrated embodiments of the invention may be had with reference to the accompanying drawings, in which:

Figure 1 shows a magnetic storage unit in the form of a drum adapted to the purposes of our invention.

Figure 2 shows a schematic layout of one form of the invention.

Figure 9:
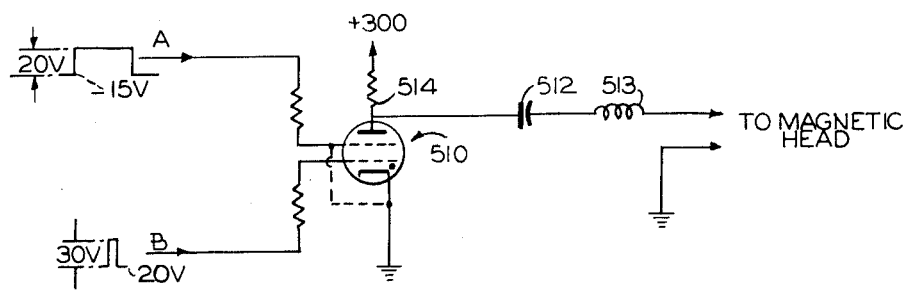

Figure 3 schematically illustrates the contents of a track of the drum employed in the practice of our invention.

Figure 4 is a block diagram of a telegraph relay system which is part of our invention.

Figure 5 is a block diagram of an alternative embodiment of our invention.

Figures 6–12 show detailed circuits which are employed to fill the blocks of Figure 4.

With reference to Figure 1, this structure is taken from the co-pending patent application Serial No. 16,997, filed March 25, 1948, by John M. Coombs and Charles B. Tompkins. The invention there disclosed, and illustrated in Figure 1, may be summarized briefly as follows: the numeral 20 designates a rotary drum or cylinder mounted in suitable bearings upon a support diagrammatically illustrated at 21 and propelled in rotary motion by means such as the motor 22 and the belt 23. The drum may have a diameter of approximately 18 inches and be approximately 5 inches long. It is readily possible, by machining the drum to its finished dimensions while on its own bearings, to hold the eccentricity of the periphery to a maximum of well under .0005 inch. After the drum has been completely machined, it is then covered over its entire periphery with a tightly adherent para-magnetic substance, the rest of the drum being substantially non-magnetic. This may be done by the application of plastic tape having a pressure-sensitive coating on the side contacting the drum, and a powdered para-magnetic iron coating on the other surface. Or, alternatively, the coating may consist of a smooth sprayed-on layer of magnetic iron oxide in a suitable binder, applied in much the same manner as ordinary paint spraying.

Further with reference to Figure 1, a plurality of magnets or transducers 27 are positioned adjacent to the periphery of drum 20, the magnets 27 being so spaced lengthwise of the drum that each magnet 27 will sweep out a track or band 27a of the drum. Wherever "tracks" are referred to in this specification and in the appended claims, it will be understood that a track is simply an area of the magnetizable member and is not necessarily defined by physical boundaries on the member. In this way, each magnet will scan or record upon a drum track of predetermined width. As is shown in the drawing, the magnets 27 will be supported upon a bar 28 suitably secured to the journal bearings of base 21 so that the magnets will be positioned along a line extending parallel to the drum axis, although adjacent magnets may be offset with respect to each other circumferentially of the drum to permit them to sweep out the tracks, bands or paths which are closely spaced lengthwise of the drum. Each magnet 27 may be adjustably secured to the bar 28 so that its position circumferentially of the drum and the spacing between the periphery of the drum and the magnet can be accurately fixed.

It will be apparent that other forms of magnetizable record means may be used in place of a drum. One such means, for example, may be a magnetizable belt running over two or more pulleys. The magnets may preferably be located where the belt runs over a pulley, thereby being in a position entirely analogous to being adjacent a drum surface.

The surface speed of the record member should be capable of adjustment so that it is sufficient to provide a reasonable reading voltage in the transducers. The speed must, however, be adequate to permit the drum to keep ahead of incoming signals, as will be described in more detail below.

While the drawing illustrates a single magnet for each track of the drum, as will be hereafter explained, it may be necessary for the purpose of the present invention to utilize several magnets for different purposes in each of the tracks or bands 27a.

As schematically illustrated in Figure 1, each magnet may be of ring-like form and include a gap 29 of the order of several thousandths of an inch in width. The gap of each magnet will be positioned immediately adjacent to the drum periphery, the clearance between the magnet and the drum periphery being less than .002 inch. While the structure schematically illustrated is satisfactory, a considerably improved performance results from the incorporation of a structure described in great detail in co-pending application Serial No. 118,034, filed September 27, 1949, by William J. Field and Robert L. Perkins, and this is a preferred form for the practice of the present invention.

The magnets may have more than one winding whereby reading or recording may be accomplished from various associated circuits.

Entirely satisfactory results have been obtained by having each magnet 27 of such width to sweep out a track 27a only ⅛ inch wide. To do this, it is necessary to offset the magnets 27a circumferentially as previously explained, since the magnets themselves may be of the order of an inch wide when appropriate mounting and adjusting means are included. In the remainder of this disclosure, the necessity for off-setting the magnets for this reason will be assumed, but the application of the apparatus in the preset invention may be explained much more clearly in terms of magnets which do not require such an offset. Hence, all succeeding illustrations will show the magnets as disposed on a straight line, it being apparent to those skilled in the art that the necessary offsetting will not in any way interfere with the operation of the apparatus as described and claimed. Thus, in a drum 30 inches in the axial direction, there will be room for about 240 separate tracks 27a, or in a 5 inch drum as described above, there would be 40 tracks.

It has been found entirely possible, with the apparatus above described, to place magnetic spots on each of the tracks 27a as close as 80 to the inch circumferentially; hence, on a drum 18 inches in diameter, each track has room for 4,500 such magnetic spots. Stated otherwise, each magnetic spot occupies an area on the drum equivalent to a rectangle .125 inch in the axial direction and .0125 inch circumferentially. It is possible, by the application of techniques described in great detail in the previously mentioned application Serial No. 16,998 to cause the magnet 27 to so influence this area that it takes up a given state of magnetization which is substantially permanent. This state of magnetization is preferably that of saturation in one of two directions, either in the direction of surface motion of the band 27a or in the opposite direction, although transverse magnetization may also be employed. Aforementioned application Serial No. 16,998 discloses how this "writing" may be accomplished.

These spots, being in one state or one other state, may be defined as "binary" spots, and such nomenclature is used hereafter in this application. For the purpose of the present invention, the writings so generated may subsequently be read by the same or another similar magnet, and it will be found that this reading operation in no way interferes with what has previously been written in each elementary magnetic spot. However, the writing magnet may subsequently rewrite, on a subsequent revolution of a drum, and it will be found that this rewriting completely overrides what had previously been written.

Referring now to Figure 2, this shows how a group of eight tracks may be employed to form a single channel for the purpose of the present invention. Of these eight tracks, five may be required for storing, for example, the five intelligence streams of the pulses of ordinary 5-unit Baudot Teletype code, while the other three are required for special control purposes as hereinafter explained. It will be understood, however, that the asynchronous operation phase of our invention requires the existence of only one intelligence track, which receives spaced pulses for recording, and from which these signals may be read out. The eight tracks obviously require a space of 7/8 inch in the axial direction, in accordance with the dimensions suggested previously.

The arrangement which we provide for the automatic loading of the above-described drum in successive cells will now be explained in some detail. The immediately following descriptive material relates briefly to the functional aspects of various circuits which are associated with the magnetizable member. A more detailed description of the necessary circuits will follow.

For purposes of description, it will be assumed that the message tracks are approximately 2/3 filled with incoming stored messages, the first half of which has been subsequently read out and re-transmitted over the outgoing line.

It is of primary importance in following this description to at this point understand that a "character" is a combination of binary spots in side-by-side cells in the message tracks. That is, at any given moment, one cell of each message track is under the line of magnets 27 (Figure 1), and these cells will be comprised of flux in one of two directions (1's or 0's in binary language). Thus, if the specified cells in tracks 1, 3 and 5 (Figure 2) are 1's, and the cells in tracks 2 and 4 are 0's, this permutation 1–0–1–0–1 will form a character.

A "message" is made up of a series of characters, these characters being located in successive cells about the circumference of the track.

It is further important in understanding the basic asynchronous operation to visualize the successive cells in any one message track as containing one of the elements of successive characters. The concept of messages and characters may be dispensed with, moreover, and the "elements" considered alone as any binary intelligence which one may wish to record in sequence, as in a computing machine or the like. A plurality of message tracks are assumed in the immediately following description, however, for the reason that a group of such tracks will normally be employed in any practical installation.

The stored characters exist in two classes along the message tracks. These may be called "fresh" and "stale." A fresh character is one which has been recorded from a pulse received over an incoming line and has been written on the magnetic drum, but has not yet been read therefrom. It is desirable that the next succeeding fresh character be written in a cell immediately following the position previously assigned to the last written fresh character so that continuity of the message be established. A stale character is one which has been written as above but subsequently read and transmitted over an outgoing line; it must not be read a second time. It is also necessary that the next character to be read must be the one immediately following the character most recently previously defined as stale, or, stated otherwise, is must be the first character in the string of fresh characters. This sequence of reading is required since the message was written in such order.

The message "characters" which are made available for writing on the drum are usually spaced in time sequence, and, as will be explained in detail below, may arrive at a rate much less than the rate of drum travel. That is, the drum may revolve several times between each writing or reading operation. Locating means are therefore provided to cause a writing or reading operation to take place only at the correct position of the drum relative to the transducers, no matter how many revolutions have occurred since the previous operation.

It is necessary for the locating arrangement to know whether any given character is in the fresh or stale condition in order to determine the next space to be assigned to the next incoming fresh character and in order to determine the next character to be read out over the outgoing line. Such indication is provided by another track of the channel shown on Figure 2 as the "Indicator Track." This indicator track, and also the "Delay Tracks," hereinafter described, are in every way identical to the five storage tracks as far as the layout of the magnetic tape on the drum is concerned. The only difference between the storage tracks and the other two special tracks is in the function they serve and therefore in the manner in which the reading and writing heads are arranged adjacent to these tracks, and the manner in which these heads are operated.

In the illustrated embodiments a maximum of one writing operation and one reading operation is permitted on each drum revolution, and written characters are located at consecutive angular positions of the drum. In a drum of dimensions as previously described, operation at 1725 R. P. M. would permit reading and writing each to take place at a rate, calculated at once per revolution, of 29 characters per second, or about 290 (6-letter) words per minute. Since a channel of the drum will have a capacity of 4,500 characters or 750 (6-letter) words, it follows that one channel would have a time capacity equivalent to 10 minutes of 75 words per minute outgoing line traffic. If a greater time capacity is desired, this may be provided by increasing the drum diameter or by providing several channels and control means whereby these several channels are used consecutively. Also, several operations could be had during each revolution of the drum by originally establishing several consecutive series of fresh and stale characters. However, a time capacity of 10 minutes is known to be adequate for many types of operation, and the present illustration is directed to such a type of operation.

Referring to Figure 2 for an explanation in greater detail, this shows a magnetic drum 20 rotating in the direction of arrow 31. The eight tracks on this drum comprise five message tracks, an indicator track, a writing delay track, and a reading delay track. On each message track there is a combined reading and writing magnet indicated by the letter D. (This and other magnets mentioned herein may also be referred to as transducers.) This magnet may be of the type previously mentioned, having a single gap, but having separate reading and writing windings. In fact, two separate writing windings are provided. The magnets D are shown to be all in a straight line, but they may be positioned in some other manner for mechanical convenience. It will become apparent as this description develops that electrical interconnections between the magnets will provide the equivalent of "mechanical" alignment, the latter being employed mainly for convenience in description.

The indicator track requires one reading magnet R and one writing magnet W. The indicator reading magnet is arranged to be aligned with the row of message magnets D, and the writing magnet W is positioned at a convenient distance downstream of the reading magnet R, this distance may be referred to as a "delay distance."

Proceeding now to the delay tracks, one is used in conjunction with recording through the magnets D, and the other track is used in conjunction with reading from the magnets D. These are termed the writing delay and reading delay tracks, respectively. Each delay track is also equipped with an erasing magnet E upstream of the two magnets. These erasing magnets may incorporate a permanent magnet or may be similar to the previously described magnets but would have the coils thereof carry a constant current, so as to "erase" the tracks to one of the binary states.

The writing magnets in each delay track are shown to write in prolongation of the line of magnets D. The reading magnets R of the delay tracks are then placed at the previously defined delay distance from their writing magnets in the direction of rotation of the drum.

Whenever an incoming message is received, its sequence of pulses may be broken down into a series of five streams, and these five streams may be made available at the appropriate time to the writing coils of the magnets D of the five message tracks, as will be hereinafter described in detail. These five writing magnets may thus serve exactly the same purpose, for example, as the five punches in an ordinary teletypewriter reperforator. Stated otherwise, they make one type of notation (such as a punched hole) to indicate a mark signal and another type (such as no-punch) to indicate a space symbol. In the case of the writing magnets of the present invention, the mark symbol will be denoted by magnetizing the appropriate small spot of the periphery of the drum 20 in the direction of arrow 31, whereas a space symbol will be noted by magnetizing in the opposite direction (although the inverse convention, or transverse magnetization, is equally workable). This, of course, is a typical binary notation, and one which may be expressed more conveniently by using the binary symbols 0 and 1. The magnetization is preferably great enough to saturate the magnetizable medium. Stated otherwise, a marking signal requires the writing magnet to "write a 1" whereas a spacing signal requires the writing magnet to "write a 0." Aforementioned application Serial No. 16,998 discloses how this writing may be accomplished and sets forth, furthermore, how this writing operation may take place in an area already written upon, in which case the present writing will completely obliterate and completely supersede the previous writing. Stated otherwise, the writing of a 1 or a 0 does not presuppose any particular prior preparation of the magnetic material and, in particular, it does not presuppose the erasing of the tape to a "neutral" condition.

The five magnets D associated with the five message tracks are capable of sensing whether 1's or 0's have been written on the magnetic material as it passes beneath them and they are capable of rendering a suitable output signal accordingly.

Obviously reading and writing operations must take place at the proper time in order that each character being read will be the first of the string of fresh characters and in order that each character being written will be placed immediately after the last fresh character. This is the purpose of the indicator track and delay tracks, the operation of which will now be described.

In this illustration, the message tracks may be considered as containing a solid stream of fresh characters, followed by a solid stream of stale characters, the two together comprising the entire circumference of the drum. The indicator track is arranged in such a manner as to represent this condition at all times. To do this, it contains a solid string of 1's (each such 1 indicating that the associated generatrix of the drum is occupied by a fresh character), followed by a solid string of 0's (each such 0 indicating that its associated generatrix on the drum is occupied by a stale character). This convention may obviously be reversed.

This condition is illustrated in Figure 3 which shows a cross section 3—3' of the indicator track of drum 20, rotating as before in the direction of arrow 31. The criterion for writing is that the first 0 after the solid string of 1's is the location at which the writing magnets should operate. Similarly, the criterion for reading is that the first 1 after the string of 0's is the location at which the reading magnets should operate. This action may be stated otherwise by considering what must take place under the reading magnets of the indicator track. The reading magnet R must take note of any transition from 1 to 0 on the indicator track and at that time only will cause the writing coils of the magnets D to operate. Assuming that the reading magnet R has detected a transition from 1 to 0, the associated character available to the magnets D must be immediately written into the cell at which the transition occurred, and thus, the character on the message tracks will have changed its status from "stale" to "fresh." Now the appropriate portions of the indicator track must be altered to indicate this new status so that this sequence of operations may be permitted to continue on the next rotation of the drum. To do this, it is necessary that the indicator cell which caused the writing action in the first place must now be altered to its opposite condition to represent a fresh character.

It is not possible at the present state of the art to read a cell and simultaneously to alter it, as the requirements for reading (at low energy levels) and for writing (at high energy levels) are incompatible unless they are separated in time. For this reason the indicator track is provided with the writing magnet W, which is spaced the so-called delay distance "downstream" from the indicator reading magnet R. The reading magnet R is adapted to detect the first 0 (or the first 1, as the case may be) and this detection is arranged to trigger the appropriate course of action in the magnets D associated with the message tracks. The drum will continue to rotate the delay distance, after which the writing magnet W of the indicator track will reverse the condition of the cell on the indicator track which initiated the entire chain of events. To do this, means are provided to delay the altering of the leading 0 or 1 for a length of time such that the drum will have moved the delay distance between the reading and writing magnets of the indicator track. Such a delay may be furnished by any number of well-known electronic schemes, such as delay circuits, but it is preferable to accomplish this directly on the drum. Doing this directly on the drum is particularly valuable since the system is automatically synchronized without concern as to irregularities in the speed of the drum.

The action of the delay tracks is as follows, considering first only a writing operation: When the reading magnet R of the indicator track detects a 1-0 transition, it not only operates the five writing magnets D but also operates the writing magnet W of the writing delay track and causes it to write a 1. The writing magnets of the delay tracks are invariably approached only by a track which has been previously erased by the magnets E so that the tracks are in a 0 condition. When the delay writing magnet operates, it superimposes on the delay track a single 1 at the appropriate position. This single 1 is carried by the rotation of the drum up to the associated delay reading magnet R whereupon it causes the writing magnet of the indicator track to write a 1 on the indicator track. Since the distance from R to W of the indicator track is arranged to be the same as the distance from W to R of the delay track, it follows that these four magnets and their associated circuitry (to be described) will cooperate in such a way that the writing of the 1 on the indicator track will take place directly over the position formerly occupied by the first 0 thereof, thereby extending the length of the string of 1's by a single cell and diminishing the length of a string of 0's by the same amount.

The operation of reading out the first fresh character stored on the drum takes place similarly. That is, the first 1 of the indicator track initiates the action of the reading coils of the magnets D associated with the five message tracks and simultaneously writes a 1 on the previously 0ed reading delay track; when this 1 reaches the reading magnet of the reading delay track, it causes the writing magnet of the indicator track to write a 0, thereby changing the first 1 to a 0 to indicate that this character has been read and now is in the stale condition.

Description of circuits for carrying out the asynchronous or sequential utilization of the cells on the message track(s) of the drum will now be made. Reference will be made to block diagrams in connection with Figure 4 and suitable detailed circuits for insertion in the blocks will then be described when necessary in connection with other figures of the accompanying drawings. Those well skilled in the electronic arts will understand the details of the circuits from the common names, thereof, such as flip-flops, gates, and pulse forming circuits. The reading of the specification at this point will accordingly not be delayed with detailed descriptions of these circuits, although an appendix is included later to briefly describe suitable circuits which may be used in the blocks now referred to.

In Figure 4, the previously described drum as illustrated in Figures 2 and 3 is designated in the dash line indicated by the numeral 20, this drum rotating in the direction of the arrow 31. This direction of rotation is the same as that diagrammatically illustrated by the arrow 31 in Figures 2 and 3. It will be noted that the drum 20 has indicated thereon the same layout of magnets D, R and W as in Figure 2, and the following description will utilize the same nomenclature. The only addition to the showing in Figure 4 is an additional reading magnet 42 which operates over a timing track on the drum. This track on the drum has permanently recorded thereon a continuous, uniform and unbroken train of varying magnetic flux pulses. Each of these pulses is employed to define one of the discrete angular positions or cells of the drum at which information may be recorded or read. The timing pulses, indicated by the legend TP on the drawing, are generated by timing track flux. These are narrow pulses of a time duration commensurate only with a fraction of the cell width on the drum at normal operating speeds. The function of these timing pulses is to synchronize several operations which will be hereafter described so that reading and writing takes place within the cell limits on the message tracks, and on the indicator and delay tracks as well. The concept of timing pulses to synchronize operations is further developed in the earlier cited patent application, Serial No. 16,998.

The timing pulses TP are derived from the timing track by means of the timing pulse generator (TPG) 43, this being an amplifying and clipping circuit which will produce narrow well defined pulses. Such circuits are well known and need not be described in detail here.

The numeral 44 indicates generally a group of writing circuits (WC) of which two are provided for each of the message magnets D. The message magnets D are of any conventional variety, such as those earlier referred to in this specification, but are distinguished by having two separate writing coils. A separate WC circuit is then provided to each writing coil of each magnet D to send current through the respective coils in the proper direction to write either a 1 or a 0 on the message tracks. A suitable WC circuit may comprise a two-grid gas tube arranged to produce a pulse of output current when both grids are concurrently enabled with suitable biasing signals.

Assuming that the writing circuits have been previously operated according to the above functional analysis, the message tracks will contain a series of so-called fresh characters followed by a series of stale characters, and the indicator track will contain a series of 1's aligned with the fresh characters and a series of 0's aligned with the stale characters. This is as described in connection with Figures 2 and 3.

The reading magnet R of the indicator track, now designated as 45, continuously reads the series of 1's and 0's and this continuous series of signals is supplied to a reading amplifier circuit (RA) 46. This circuit performs the function of producing an output pulse for every 1 which the magnet 45 reads, and of producing no pulse when the magnet 45 is reading zeros.

The RA circuit may comprise means for amplifying the signal derived from the magnets and then clipping the negative portions of the amplified signal to pass only a positive pulse. This RA circuit 46 is then connected to a phase inverting circuit (PI) 47. A suitable phase inverting circuit may be found in the text "Electronics," by Elmore and Sands, McGraw-Hill Co., 1949. This circuit performs the function of passing the RA output signals in substantially their input form on one output line 48 and on a companion output line 49 producing the inverted RA46 output signals. The non-inverted RA46 signals which appear on lead 48 are then introduced into a gate 50 which will transmit a signal pulse on a lead 51 while a pulse on lead 48 exists simultaneously with one of the timing pulses TP derived from the timing pulse generator (TPG) 43. In other words, the line 51 will carry a stream of pulses indicating the presence of fresh characters under the indicator reading magnet 45. It will be understood that a gate circuit usually comprises a multi-grid tube which will undergo an anode swing when enabling bias signals are present on the grids concurrently. Similarly, the inverted RA46 pulses appearing on line 49 are introduced into a gate 52 and this gate performs the function of establishing a stream of pulses on an output line 53 while timing pulses TP coincide with the absence of 1-indicating pulses in the RA46 and PI47 circuits. In other words, the lead 53 carries a stream of pulses representing the existence of zeros under the indicator reading magnet 45. In summary, while 1's are passing under the reading magnet 45, lead 51 will carry a stream of pulses, as synchronized by timing pulses TP, and while zeros are passing under the indicator reading magnet, the lead 53 will carry a stream of pulses synchronized with the TP signals.

Now, assuming that the series of 1's is passing under the indicator reading magnet 45, it will be recalled from Figure 3 that when the first zero appears under this magnet, a writing operation is to occur both in the message magnets D, and in the writing delay magnet W, here indicated at 54. This function is carried out in the following manner: A flip-flop circuit (FF) 55 is provided having its input leads connected to the leads 51 and 53 and having its outputs cross-connected to gates 56 and 57. The gates 56 and 57 have their second inputs connected to the leads 51 and 53, respectively. It will be apparent that when the last 1 has passed under the indicator magnet 45, the pulses on lead 51 will stop and a leading pulse will appear next on the lead 53. This initial pulse on lead 53 passes gate 57, but the pulse also has the action of reversing the flip-flop 55 so that the gate 57 is thereafter closed. But gate 56 receives an enabling signal from the output of the flip-flop 55 and this gate 56 is then available to transmit the next leading 1 pulse.

Those skilled in the art will realize that a flip-flop circuit comprises a pair of tubes having their grids and anodes cross-connected in such fashion that one tube conducts and the other is cut off. Consequently, the anode potential of one may be termed a 1 and the other a 0—a true binary representation. The circuits are further characterized by the fact that a negative pulse applied to the grid of the conducting tube will cause a shift of conduction to the other tube, and, further, a subsequent negative pulse on the other tube will reshift the conduction.

It may also be pointed out at this point, that flip-flops and gates, as interconnected in Figure 4, have switching properties such that if a pulse is impressed upon a gate at the same time that a transition of the gates enabling flip-flop is initiated, the flip-flop state which existed prior to the transition determines whether the gate transmits the pulse. This is so because the transition time of a flip-flop is long relative to the duration of the timing pulse, but is still somewhat shorter than the interval between successive timing pulses, and also the transit time of a pulse through a gate is very short relative to the flip-flop transition time. As applied in Figure 4, this means that while the gates 138 are opened by the same pulse on lead 160 which resets the flip-flops 136, nevertheless, the gates 138 transmit the code pulse which existed previously.

In this description the gate circuits are arranged to respond to positive pulses on their input sides, and flip-flop circuits respond only to negative pulses. The drawings accordingly are intended to show that wherever a gate, for example, is adapted to enable another gate and to also operate a flip-flop, the single line on the drawing extending between these units will in fact comprise a sufficient number of leads to permit both negative and positive pulses to be transmitted from the first gate to the other circuits. That is, each gate circuit may, if necessary, comprise a suitable phase inverting circuit to provide both negative and positive pulses.

Further, with regard to the layout of flip-flops and gates in Figure 4, the flip-flops will be described according to their set and reset sides, which will be the right-hand side and the left-hand side, respectively, looking from input to output. The directional arrows on the connection lines in Figure 4 will indicate the inputs and outputs.

Proceeding with Figure 4, the output of gate circuit 57 is connected to line 58, and the first mentioned leading 0 pulse on this line is introduced to one input of a gate 59. The other input of the gate 59 is connected to a lead 60 which, as will be more fully explained below, is adapted to deliver a signal indicating that there is a message character available, as in the writing circuits 44, for recording. Assuming for the moment that the gate 59 is enabled by the lead 60, the previously mentioned pulse on lead 58 will be delivered to a writing circuit 61 and this circuit will write a 1 in the writing delay track by means of magnet 54. This track has been previously erased by its magnet E.

After the drum has rotated a distance sufficient to move the 1 on the writing delay track to a position beneath the reading magnet 63 of the writing delay track, this magnet 63 will read the 1, which will be amplified in RA circuit 64 and this 1 will be written by the indicator writing magnet 65 by means of the writing circuit 66. A 1 will accordingly appear beside the new fresh character in the message tracks.

The output of the gate 59 which delivered a pulse to the writing circuit 61 also delivered this pulse through a lead 67 to circuits (to be described below) which cause a simultaneous writing through the writing circuits 44 to the message magnets D. Thus, from the circuits described, it will be understood that as the first zero on the indicator track appeared under the reading magnet 45, the magnets D were operated and, simultaneously, a 1 was written in the writing delay track by magnet 54. Then, the indicator track was subsequently altered after the delay magnet 63 had written a 1 in place of the previous 0 in the indicator track by means of magnet 65, this 1 being aligned with the just written fresh character in the message tracks.

The operation of reading is carried out in analogous fashion with the cooperation of the reading delay track. It will be recalled from Figure 3, that reading should take place in the space behind the last 0. In other words, a reading operation should take place when the 0's on the indicator track beneath the reading magnet 45 change to 1's. This function is carried out by means of a gate 70 connected to the previously mentioned gate 56 by means of lead 71. It will be recalled from the above that the first of a series of pulses appearing on lead 51, which indicates the beginning of the series of ones on the indicator track, triggers the flip-flop 55 but permits the gate 56 to pass one pulse. Gate 56 is connected at its output side through line 71 as stated to the gate 70, and if the gate 70 is enabled by a suitable signal on lead 72 (such as was the case with line 60) the pulse on the lead 71 will be transmitted through the gate 70 and into a writing circuit 73. The writing circuit 73 will then write a 1 on the previously erased reading delay track by means of the magnet 74. After the drum has revolved the delay distance, the reading delay magnet 75 will cause a 0 to be written in the indicator writing magnet 65 means of a reading amplifier 76 and a "0" writing circuit 77. It will be understood that the signals read from the D magnets were properly transmitted under control of apparatus associated with a lead 78, this apparatus being described below.

As to the layout of the magnets, it will be apparent that, aside from the delay distances between the R and W magnets of the indicator and delay tracks, and relationship between magnets along the tracks is satisfactory because the electrical connections serve the purpose of "alignment."

The operation of the previously described drum operating techniques will now be described in connection with teletype systems.

In connection with the communications art, it is frequently necessary to relay messages from one incoming communication circuit to another outgoing communication circuit. In some cases, it is possible to connect the circuits together, either directly or through the medium of a simple electronic or electromagnetic relay. Similarly, at a terminal point in which no further relaying is required, it may be possible to place a transcriber, such as a teletypewriter, or a pen-and-ink recorder, for example, directly on the incoming line, and this is known as "on-line" operation. But on-line operation is not always desirable and, in fact, may be physically impossible. As an example, one may consider a telegraph office having a plurality of incoming and outgoing lines and handling traffic characterized by substantially random originators and directed to substantially random addressees; in such a case, it is clear that several of the incoming circuits may simultaneously desire to communicate over a single outgoing circuit, or with a single addressee. To provide for such a case, it is obviously necessary that the incoming signals of at least all but one of the circuits must be delayed or stored in the message center until circuit time is available on the outgoing line. If this is not done, then it becomes necessary to delay incoming traffic until the desired outgoing circuit is available, thereby wasting the facilities of the incoming circuit.

The need for such storage has long been recognized, and it is the present practice to handle all incoming traffic at a message center by a technique known as "off-line" operation. Off-line operation features a plurality of storage devices, one connected to each of the incoming lines, and so arranged that there is continuously available at the ends of these incoming lines a repository for incoming messages. By this means, each incoming line is always assured of a facility for the reception and temporary storage of its messages; therefore, there is never any necessity for delaying incoming traffic on the incoming lines. At the present time, the most common method for providing such a storage means is to connect to the incoming line a device capable of receiving the incoming signals and storing them in the form of perforations on a narrow paper tape. The messages so stored may then be sent out on the proper outgoing line, whenever convenient, by means of another device which senses the perforations in the tape and converts them back to impulses of electrical form. When used in connection with messages of the teletype variety, the device connected to the incoming line is generally known as a "reperforator," and the device connected to the outgoing line is generally known as a "transmitter-distributor." Further details may be found in numerous publications and patents, of which U. S. Patent No. 1,851,838 is typical.

In the present invention, hereinafter described in greater detail, incoming signals are stored on the magnetizable medium; these signals subsequently are sensed magnetically and used to generate an impulse in an outgoing line, after which the signals are erased or overprinted by a new incoming message character in such a manner that the old character is obliterated and replaced by the new. There is a further advantage in the method of the present invention in the complete elimination of all of the parts subject to rapid wear, such as the punches and dies of the reperforator and the sensing fingers of the transmitter-distributor, and the intermittent tape advancing mechanism of both, thereby reducing maintenance and servicing requirements to a minimum.

In further detail, the following disclosure relates primarily to the relaying of so-called 5-unit Baudot code Teletype transmissions. This system is well-known to those skilled in the art and need not be described further. However, the apparatus described herein is obviously suitable to other telegraphic systems for the transmission of intelligence, and it is not the intention of this description to limit the invention to the scope of the chosen typical example, which is given by way of illustration only. It will further be apparent that the invention provides means for relaying without any appreciable storage time, and that the information or "message" may be data of the sort used in calculating and statistical apparatus.

Further by way of illustration, but not with intent to limit the scope of this invention, the operation of a message center on cross-office traffic may be used as a typical example. At the present time, cross-office traffic is received somewhat intermittently at about 125 words per minute and re-transmitted, as steadily as practicable, at about 75 words per minute. In other words, there may easily be a build up in the amount of stored intelligence.

Illustrative circuits for operating with a start-stop Baudot code system will be described. An incoming telegraph line, designated at 110 (Figure 4), is connected through a two position relay 112 to ground. In start-stop operation, the circuit on line 110 is normally closed and the relay arm 114 will, therefore, normally be in contact with the terminal 116. (It may be stated at this point that the operation of a stop-start telegraph system may be fully understood from section 22, paragraph 181 of the "Standard Handbook for Electrical Engineers," 7th edition, published by McGraw-Hill Book Company in 1941.) When the circuit on line 110 is momentarily opened to start the reception of a five unit character, the relay arm 114 momentarily contacts the terminal 118, which completes a circuit to the inner start segment 120 of the start-stop incoming distributor indicated generally as 122. The circuit is then transferred to the outer start segment 124 through the bridging brush 126. A circuit is then completed to ground through the coil of a starting solenoid 128. The arm carrying the bridging brush 126 is under a constant torque, as through a friction clutch, produced by a motor whose speed is synchronized to the incoming signals on line 110. In other words, the brush will make one revolution for each character received on line 110. Relatching on each revolution prevents the accumulation of an error in speed. Now, when a circuit is momentarily made through solenoid 128, the latch arm 130 operated by the solenoid 128 will release the brush arm and the latter will begin rotating clockwise, as viewed in Figure 4. After a short period, the brush 126 will leave the inner start segment 120 and reach the inner operating segment 132, and at this moment, the brush will also be in contact with the first outer operating segment 134. As may be more fully understood from the above cited reference to the Standard Handbook, during the time in which the brush 126 interconnects segments 132 and 134, the first code impulse, if any, will appear on the line 110. This coincidence between the occurrence of a possible impulse on the line 110 in the position of the brush 126 on the segment 134 is a result of synchronization between the signals on line 110 and the motor driving the brush 126. The impulser may be defined as 1's, and the absence of an impulse a 0.

With the brush 126 interconnecting segments 132 and 134, the existence of an impulse on the line 110 (indicating one of two possible states) will enter the input-set side to alter a previously existing situation in a flip-flop circuit (FF), which is one of a group of such circuits indicated generally as 136.

As the brush 126 of the distributor 122 continues to rotate, it will subsequently bridge between the inner segment 132 and the four remaining outer operating segments 140, 142, 144 and 146, and the possible impulses on line 110 will correspondingly set their respectively connected FF circuits of group 136 in a similar fashion. (The circuits 136 are pre-set to 0 by means described below.) At this stage of operation, the Baudot code of the character transmitted has set the just-mentioned flip-flops so that their right-hand or set sides will be either positive or negative, in accordance with the binary representations 1 or 0 of the coded character received. That is, the setting of the flip-flop circuits 136 is analogous to a punched tape having holes or no holes.

Having thus established the character in binary form in the flip-flops 136, the brush 126 then moves to interconnect the inner grounded segment 156 with an outer segment 158 connected to a timed single pulse generator (TSPG) 159. The interconnection of the segments 156 and 158 serves to denote the completion of the receipt of a character in the flip-flops 136 and also indicates to the circuit 159 that the received character is ready for recording on the drum 50.

The time signal pulse generator (TSPG) 159 is a circuit which will produce a single output pulse on lead 160 when the segments 156 and 158 are interconnected at the distributor and when this output pulse is further coordinated with a timing pulse (TP) generated by the previously mentioned TPG circuit 43.

The output pulse appearing on a lead 160 is connected to open a group of gates, indicated generally as 138, to supply the binary character to a group of flip-flop circuits 140 and to also reset the flip-flops 136, some of which were altered by the code impulses on line 110. One purpose of the flip-flops 140, which may be termed an insertion register, is to hold the character while the distributor 122 proceeds to form the next character.

It is believed clear from the foregoing description of the apparatus in Figure 4, as thus far described, that each character arriving on lead 110 is first set up in the flip-flops 136 and when completed is then passed through the gates 138 under control of the circuit 159 to insert the binary character into the flip-flops 140. The coded character, as established in the flip-flops 140, must now be retained until the drum 50 has reached the proper position for receiving the signals through the magnets D.

In some cases cross-office transmission is handled on a parallel wire, or simultaneous, basis. It should be noted that where parallel wire transmission is used on the incoming circuits, the distributor 122 and the flip-flops 136 would be absent and the control units and functions of the system diagrammed in Figure 4 would be different in several minor respects. A corresponding statement may be made regarding the output distributor 213 in cases where the outgoing transmission is on a parallel wire basis.

From an earlier part of this specification, it will be recalled that the lead 67 carries a pulse denoting a proper writing time, and it is this pulse which is inserted into the reset sides of the flip-flop 140 and also triggers the writing circuits 44.

Since it is the writing pulse on lead 67 which enables the writing circuits 44 to write through the magnets D, there is an opportunity for the circuit extending from the indicator reading magnet 45 back through the writing delay magnet 54 to continue to operate each time the transition from 1's to 0's occurs under the magnet 45. (This assuming for the moment that lead 60 continues to carry an enabling signal.) In this way, the apparatus would proceed to completely fill the drum with fresh 0's (since the flip-flops 140 had been reset to 0 by the pulse on lead 67). To prevent successive operations after the first writing operation until the flip-flops 140 have been refilled or set with a new character, the lead 60 is connected to a status flip-flop 80. The lead 67 is connected to the left-hand or reset side of flip-flop 80 and therefore simultaneously with the writing operation in circuits 44 and the resetting of flip-flops 140, the flip-flop 80 is reset so that the lead 60 carries a negative bias which will close gate 59 and prevent further writing operations either in the magnets D or in the writing delay track magnet 54. The circuit will not again be operative until the receiving distributor 122 has made another revolution and a new timed single pulse has been transmitted on lead 160. The lead 160 is connected to the "set" or right-hand side of the flip-flop 80 and when the pulse is generated on lead 160, the gate 59 is again opened to permit the recording of the new character.

The transmitting function of the relay system will now be described. The magnets D each comprise a reading coil, in addition to the two writing coils already mentioned. Each reading coil is interconnected to a reading amplifier (RA) in a group indicated generally as 210 in Figure 4. These circuits are the equivalent of the previously mentioned RA circuit 46 and produce output pulses each time the magnets D read a 1 on the message tracks. The magnets D are continuously picking up signals from the message tracks and these signals as amplified in the RA circuits 210 are supplied to input terminals of thyratron relay circuits T, indicated generally at 212. Means which will be described are provided for enabling the thyratron circuits 212 to transmit whatever binary signals may be available to them at a predetermined position of the drum. That is, the control circuit permits the transmission of signals from the first of the series of fresh characters on the message track. These signals, when transmited, are connected to five outer operating segments 214, 215, 216, 217 and 218 of a transmitting distributor indicated generally as 213. These signals will appear simultaneously on the just-mentioned segments but will remain on the segments long enough for the brush arm 220 of the distributor 213 to make a complete revolution and to transmit these segments as spaced pulses on an outgoing telegraph line 222.

The first step in properly transmitting the first in the series of fresh characters from the drum is to trigger the thyratron circuits 212 at the precise moment that the said fresh characters are passing beneath the magnets D. This function is performed by the previously mentioned lead 78 which is connected between the output of the gate 70 and the triggering inputs of the thyratron circuits 212. It will be recalled that when a reading operation is desired, the transition from 0's to 1's in the magnet 45 operates to pass a pulse on lead 71 through the gate 70, if the latter is open, and will both write in the reading delay magnet 74 and produce a pulse on the lead 78. Then, after the drum is rotated the delay distance, the reading delay magnet 75 will pick up the signal recorded by magnet 74 and will cause this signal to be amplified in reading amplifier 76 and write a 0 on the indicator track by means of magnet 65 through the 0 writing circuit 77.

As will be noted in connection with writing circuits 66 and 77 in Figure 4, these circuits are enabled by a timing pulse TP so that accurate alignment is maintained between the indicator track signal and those in the message track.

It may also be noted, at this point, that all of the single-purpose magnetic heads (that is, those marked R or W) are assumed to be capable of a mechanical positioning adjustment in the circumferential direction of the drum tracks. The recorded signals can then be readily caused to pass the gap of each head in proper synchronism and phase relative to the timing pulses TP. In the case of the dual purpose heads D, however, this freedom of independent adjustment is obviously absent. Means are provided, however, consisting of a fixed delay 224 inserted in the lead 78 between the gate 70 and the thyratron circuits 212 for simulating a circumferential adjustment.

It has been found experimentally that information written with a set of heads may be read with the same set of heads provided the sampling pulse (in this case, the pulse on the lead 78') is delayed approximately 4 micro-seconds relative to the timing pulse used in the writing operation. This reading delay compensates for a cascading of circuit and component delays which are largely associated with the writing operation. The fixed delay circuit 224 thus causes both writing into and reading from a specified cell to occur substantially at the center of its span along the track.

In the reading operation, as was an analogous situation in the writing operation, the problem exists of preventing the system from reading out the fresh message cells in sequence into the receiving distributor regardless of whether the distributor has had an opportunity to discharge the previously read character. Provision is made for meeting this problem by means of the previously mentioned lead 72 which has established thereon a signal which will hold the reading gate 70 closed until the transmitting distributor 213 is available for another character. This circuit may be traced as follows: When the transmitting distributor 213 has completed a previous revolution and has returned to a latched position, as shown in Figure 4, an inner brush 230 on the sweep arm 220 of the distributor will complete a circuit between an inner segment 232 and an outer segment 234. The inner segment 232 is connected to a source of B+ and the outer segment 234 is connected to the coil of a start solenoid 236. A pulse appearing on the lead 78', indicating that the drum is in the proper position to be read, will trigger the thyratrons to transmit signals from the RA circuits 210 to the segments 214—218, and will simultaneously cause a flip-flop 238 to trigger a thyratron relay circuit 240 through lead 242 to operate the relay 236. Energization of the relay 236 causes the latch arm 244 to release the distributor arm 220 and the latter begins to rotate under the action of a motor which is synchronized to run at a speed compatible with the system arranged to receive the relayed signals. While the arm 220 goes through a cycle to cause outer brush 231 to sequentially bridge the segments 214—218 with an inner transmitting segment 246 to energize a relay 248 which transmits pulses over the outgoing line 222, the pulse on lead 78' which unlatched the arm 220 also set the flip-flop 238 to place a signal on lead 72 which closed the gate 70 to prevent further reading operations. In other words, it is the closing of the gate 70 which prevents another reading operation on the next revolution of the drum which might alter the signals on the segments 214—218 which have not yet been covered by the brush 230.

As the arm 220 nears the end of its revolution, however, the brush 230 will bridge an inner segment 250 and an intermediate segment 252, and this will complete a circuit through a solenoid 254. Energization of the solenoid 254 ties the enabling lead 256 of a timed signal pulse generator (TSPG) 258 to ground and causes a timed single pulse on output lead 260 to reset the flip-flop 238 so that gate 70 is reopened by means of lead 72. The sweep arm 220 will then proceed to its latched position and the cycle will be available for repeating when a pulse on lead 78' indicates the next character in the message track is ready to be read.

The relay 254 in its non-energized position also serves to connect the source of B+ to the anode circuits of the thyratron relays 212, this connection being made through lead 262. After triggering by 78', the tubes conduct until B+ is removed.

When the outgoing traffic is completely caught up with incoming traffic, the message channels of the drum will become vacant and the indicator track will consist entirely of 0's. In this case, there will obviously be no transitions of 1 to 0 to produce a pulse on lead 67 to enable a new incoming character to be transmitted from the flip-flops 140. To provide a means for entering such an incoming character, an anticipator circuit 310 is provided. This circuit is indicated in the dash line on Figure 4 where designated by the numeral 310. A property of this anticipator is that it is not necessary to wait for a complete drum revolution after the reading of the last fresh character to recognize that the drum channel has become vacant.

It will be apparent that if the pulse on lead 78 indicating a reading operation is followed one pulse time TP later by a pulse on lead 58, this means that the last fresh character has been read. If the pulse on lead 67 occurs simultaneously with the pulse on lead 58, this means that the gate 59 has been opened and the last fresh character has been replaced by a new one, and the vacancy condition has been prevented. The criterion of vacancy may be accordingly stated as follows: If, at one pulse time after the pulse on lead 78, a pulse on lead 58 occurs but does not occur on lead 67, then the last fresh character has been read without being replaced with a new fresh character. It therefore follows that a random entry through the writing circuits 44 is justified if a new character is available in the flip-flops 140, and this coincidence of (1) the pulse on lead 58, (2) a "set" position of flip-flop 80 (indicating no pulse on lead 67), and (3) a pulse during the proceeding pulse time on lead 78.

To establish the just-mentioned coincidence, a triple input gate 312 is provided within the circuit 310 and this gate recognizes the coincidence of the three previously mentioned situations. The gate 312 performs its function by having one connection by means of lead 314 to lead 58, having a second connection to the reset side of flip-flop 80 by lead 316, and having a third connection by means of lead 318 to a circuit branch which detects the existence of a pulse on lead 78 during the previous timing pulse TP. In respect to the latter, a pulse on lead 78 is connected through lead 320 to the set side of a flip-flop 322 and the setting of flip-flop 322 serves to open a gate 324 connected to the set output of the flip-flop 322. The other input of the gate 324 is connected to the source of timing pulses TP, and the next timing pulse will be transmitted through the gate 324 and into the lead 318. This output pulse will also serve to reset the flip-flop 322 through the lead 326.

Given the simultaneous existence of pulses on leads 314, 316, and 318, the triple input gate 312 will produce an output pulse on lead 328 which will serve to reset a flip-flop 330. The resetting of the flip-flop 330 will then produce one of two necessary enabling signals to a gate 332. The gate 332 has its other input connected to lead 53 and, therefore, as the gate 332 is opened by flip-flop 330, it serves as a by-pass supply of synthetic "stale" or 0 pulses from the lead 53 to the lead 58. Now, the arrival of a new fresh character in the flip-flops 140 (by the arrival of the pulse on lead 160) sets the flip-flop 80 and thus permits gate 59 to generate a pulse on lead 67. The last mentioned pulse then triggers the writing operation and simultaneously restores the anticipator to its non-vacant condition by setting the flip-flop 330. The latter resetting is accomplished by means of line 334 extending from line 67 to the set side of flip-flop 330.

It is also possible that more characters will be received than can be accommodated in a track. In such case, it would be desirable to obtain an indication of a nearly filled condition so that the input could be transferred to another channel on the drum. Means (not shown) for accomplishing this may be readily provided, based on detecting a minimum time between a pulse on line 58 (denoting when writing may take place) and a pulse on line 71 (denoting when reading may take place). Obviously, if the apparatus may read immediately after writing, the track is nearly filled. The pulses on lead 51 may also be viewed on an oscilloscope for the same purpose.

Figure 5 schematically illustrates another embodiment of our relaying arrangement, this species requiring only seven tracks. Instead of using dual purpose message magnets, separate message writing and reading magnets are arranged to operate with separate indicator-delay sections. It will be immediately apparent that the individual layouts are the equivalent of the previously described embodiment, the indicator magnets here being duplicated and one delay track being employed for the two operations.

In more detail, considering first the writing section, the indicator reading magnet 810 supplies a circuit 812 with 1 and 0 signals. The circuit 812 is the equivalent of the circuits in Figure 4 and will produce an output pulse only when a 1 to 0 transition occurs. This transition will then write a one in delay magnet 814 and simultaneously trigger the writing circuits 816. The delay reading magnet 818 will then read the 1 and write a 1 in the indicator track by means of writing circuit 820 and magnet 822.

The blocks 824 and 826 represent the receiving distributor and assembling register, respectively, of the embodiment of Figure 4.

It is believed unnecessary to describe the reading section of the embodiment of Figure 5 in detail, since the operation is strictly analogous to that in Figure 4.

We wish it to be understood that many other embodiments of our invention will occur to others, and, therefore, the scope of our invention is to be determined from the appended claims and is not to be limited by the foregoing detailed description.

*Appendix.*—The following described circuits are illustrative of suitable circuits for use in the correspondingly labeled blocks in Figure 4 of the drawings. It will be understood that the components and specific arrangements shown represent simply one possible combination, and no limitation on the scope of the invention is intended. Minor changes in D.-C. levels, signal amplitudes, impedances and changes in pulse polarity may be necessary for the use of these circuits at particular places, but such changes will be apparent to those skilled in the electronic art.

*Flip-flop (FF).*—Flip-flop circuits are well known in the electronic art. (See, for example, Electronics: Experimental Techniques, by Elmore and Sands, McGraw-Hill Book Company, 1949, pages 96 through 99.) Figure 6 shows a suitable flip-flop circuit for insertion in the FF blocks of Figure 4, this circuit comprising two triodes 410 and 412 having their anodes and grids cross-connected and being further provided with cathode follower output circuits indicated generally as 414 and 416. The set and reset leads and output leads are labeled on the drawing. The circuit operation is such that if the tube 412, for example, is initially conducting, a negative input pulse applied to the set input lead will trigger the circuit to cause tube 412 to cut off and its anode, accordingly, to take a positive swing so that the set output lead goes from a low positive potential to a high one. The anode of tube 410 simultaneously goes from a high to a low positive potential. This new state of the set and reset output terminals will continue until such time as the reset input terminal receives a negative pulse.

*Gate (G).*—Figure 7 shows a suitable two input gate comprising a suitable pentode 450 (of which tube type 6AS6 is representative) with two of its control grids connected to two input lines designated as A and B. This circuit will permit conduction in the anode circuit of tube 450 only when sufficiently positive signals simultaneously exist on both inputs A and B. The result is that a negative pulse will be available at one output terminal during the time that the two input signals coincide, and also, by means of a transformer 452, a positive pulse will be available at another terminal. Figure 8 shows a similar circuit which, however, employs a tube 460 having three control grids which may be simultaneously biased and/or pulsed at input terminals A, B and C, to provide one output pulse whose duration is substantially equal to that of the shortest of the three input pulses. These multiple input gate circuits are otherwise known as coincidence circuits.

*Writing circuit (WC).*—Figure 9 shows a circuit having a gas filled tube 510, such as type 2D21, which is arranged to have one of its control grids connected to an input terminal A and the other control grid connected to an input terminal B. When this tube is caused to conduct, by the simultaneous presence of sufficiently positive signals on both input terminals, the capacitor 512 discharges through the inductance 513 and a writing winding of a magnetic head. The current pulse which flows through the writing winding has approximately the shape of a half sine wave and has a duration of the order of several microseconds. The signal applied to input terminal B consists of a pulse whose duration is of the order of a fraction of a microsecond. Following the single current pulse through the writing winding the tube ceases to conduct and the capacitor 512 begins to recharge via resistor 514. The interconnection of this circuit to the writing winding is such that the writing current pulse will flow in a direction in the winding appropriate to write a 1 or a 0 as desired. If no enabling signal is required at input terminal A for a particular writing circuit, then the grid connected to input terminal A may be connected directly to the cathode of the tube.

*Thyratron relay circuit (T).*—Methods of using a thyratron, or gas filled tube, such as type 2D21, to control a load in a D.-C. circuit are well known. If the control grids of such a tube are connected to input terminals as in Figure 9, and if the anode circuit contains a load, such as a relay coil for example, then the simultaneous application of sufficiently positive signals to both input terminals will cause the tube to go into conduction. Current will continue to flow in the anode circuit thereafter, until the anode circuit to B+ is opened.

Figure 10:
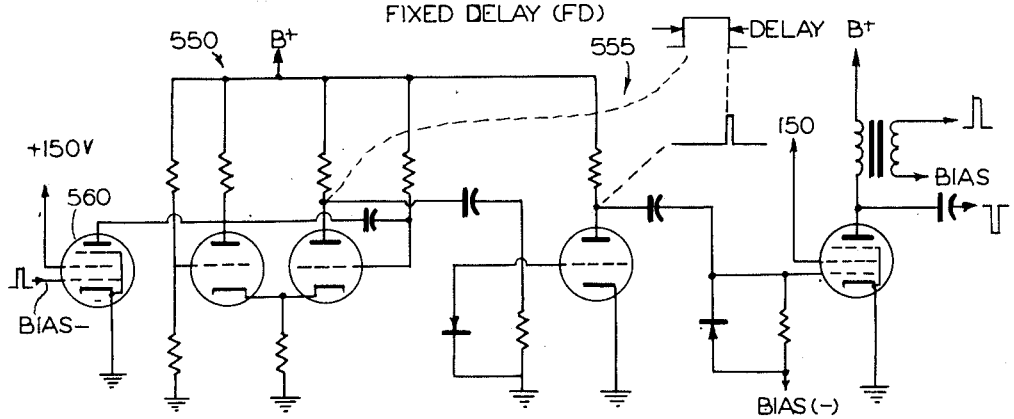

*Fixed delay (FD).*—Figure 10 shows a circuit whose purpose is to produce a pulse at an output terminal a definite time interval after a pulse has been impressed upon its input terminal. The principal element of this circuit is a delay multivibrator (see Elmore and Sands, cited above, pages 87 through 92). A positive pulse applied to the input terminal causes the pentode 560 to trigger the delay multivibrator, indicated generally as 550. Upon returning to its original state, the delay multivibrator generates a transition pulse which is inverted and amplified to produce the desired output signal. Both a positive and a negative output pulse are available as indicated.

*Reading amplifier (RA).*—Figure 11 shows a circuit in which the signals from the reading winding of a magnetic head, indicated at 610, are differentiated, amplified in three stages indicated generally as 612, and subsequently clipped, as indicated at 614 and 618.

*Timing pulse generator (TPG).*—The purpose of the timing pulse generator, shown as block 43 in Figure 4, is to convert the signals delivered by the timing track reading magnet 42 into a continuous train of short duration pulses for general synchronizing purposes. The pulse signals from the timing track reading magnet are amplified in an amplifier which is tuned to the repetition frequency of these pulses. The resulting sine wave signal is converted to a train of negative half sine wave pulses, by means of a conventional clipping circuit. These negative signals then trigger a suitable peaking circuit to provide sharp pulses of short duration. These are finally amplified and presented at the output terminal of TPG as a continuous train of sharp pulses.

*Timed single pulse generator (TSPG).*—The purpose of the timed single pulse generator TSPG, shown as block 159 and also as block 258 in Figure 4, is to produce a single pulse (synchronous with one of the timing pulses TP) at its output terminal, when an input terminal (normally on open circuit) is momentarily connected to ground. Figure 12 shows a suitable circuit for this purpose. Timing pulses TP are applied through lead 710. Lead 712, which normally floats at a small negative potential, is momentarily connected to ground by means of a contact on relay 254 or by the bridging of distributor segments 156 and 158 in Figure 4. The momentary grounding operation discharges the gas tube in the slow recovery relaxation oscillator circuit 714 to produce a negative pulse which is then shortened in circuit 716. The resulting negative pulse sets flip-flop 720, which enables gate 722. The first timing pulse to appear on lead 710 after this gate is enabled results in a pulse on lead 724, which sets flip-flop 726. This results in the enabling of gate 728. The next timing pulse on lead 710 passes through gate 728 and appears on lead 740. Two sets of flip-flops and gates are used here because it is possible for gate 722 to transmit a pulse of substandard size, in the event of a coincidence between the enabling of gate 722 and the occurrence of a timing pulse on lead 710. It will be evident that only a pulse of full size can be transmitted by gate 728. The resulting pulse is then amplified in the circuit of tube 730 and, by means of the pulse transformers 732, is made available as both a positive pulse and a negative pulse at separate output terminals. Circuit 734 produces a signal which is delayed by approximately one-half of a timing pulse period for resetting flip-flops 720 and 726. The time constants of the grid and anode circuits of the gas tube circuit 714 are chosen to make the circuit insensitive to imperfect contact conditions on lead 712. The gas tube is fired upon the initial making of the grounding contact, and cannot be fired again until after a suitable time has elapsed.

We claim:

1. In magnetic relaying apparatus, a continuous record member comprising magnetizable material, a magnetic transducing arrangement adapted to be positioned adjacent the record member to sweep out a first track area on the surface of the record member, means to move the record member relative to the transducing arrangement to cyclically pass the transducing arrangement, circuit means to enable the transducing arrangement for a transducing operation in a predetermined area of the member, and means to enable the transducing arrangement for a subsequent transducing operation in an area of the record member immediately adjacent the previously used area, said last mentioned means comprising magnetic recording and reading means positioned in operative relation to the member to sweep out a second track area on the surface of the record member for recording and reading indicating flux for detecting the passage of the said immediately adjacent area adjacent the said transducing arrangement.

2. In magnetic relaying apparatus, a continuous record member comprising magnetizable material, a first magnetic transducing arrangement adapted to be positioned adjacent the record member, means to move the record relative to the transducing arrangement to cyclically pass the transducing arrangement so that the transducing arrangement sweeps out an intelligence track over the record, and means to enable the first transducing arrangement to operate on a subsequent cycle of travel of the record while passing an area of the track immediately adjacent a previously used area, said means comprising a second magnetic transducing arrangement adapted to induce an area of indicating flux in a companion track at a position related to the said previously reserved area of the message track, said area of indicating flux operating a third transducing arrangement to enable the first transducing arrangement for operation when the said first arrangement is opposite the said immediately adjacent area.

3. In magnetic apparatus, a continuous record member adapted to have a magnetizable intelligence track area on the surface of the record member, means to cyclically move the record member, said track area adapted to contain a series of signal flux areas, first transducing means for recording and reading signals into and from the intelligence track, and means for recording and reading successively received signals in successive order on and from the intelligence track, said means comprising second transducing means adapted to record on an indicating track a flux area identifiable with the previously used area of the intelligence track, third transducing means adapted to detect a subsequent passage of the indicating flux area, and means connected with the said third means to enable the first transducing means to operate in an area of the intelligence track immediately adjacent the previously used area.

4. In magnetic apparatus, a continuous record member adapted to have a magnetizable intelligence track area on the surface of the record member, means to cyclically move the record member, said track area adapted to contain a series of signal flux areas, first transducing means for recording and reading into and from the intelligence track, and means for recording and reading successively received signals in successive order on and from the intelligence track, said means comprising second transducer means adapted to write a signal flux in a magnetizable delay track simultaneously with the operation of the transducers in the intelligence track, delay reading transducer means adapted to read the delay signal flux after the record member has moved a delay distance, means connecting the delay reading transducer means with a writing transducer in an indicator track, the last mentioned transducer being adapted to change the indication in an indicator flux area identifiable with the previously used area of the intelligence track, and indicator track reading transducer means adapted to control the operation of the said first transducing means, whereby each time the intelligence track transducers are enabled for operation the flux in the indicator track in the associated area thereof is changed within a cycle of travel of the record to indicate the change in status of the intelligence track area so that on successive cycles of travel of the record member the intelligence transducers operate in successive areas of the intelligence track.

5. In magnetic apparatus, a continuous record member comprising magnetizable surface areas, means to cyclically move the record member, a continuous magnetizable intelligence track area on the record member adapted to contain a series of areas reserved for received signal fluxes and a series of areas reserved for transmitted signal fluxes, a continuous magnetizable indicator track area on the record member, said indicator track being adapted to contain one series of flux concentrations of a first character associated with the series of received signal areas of the intelligence track and to contain another series of flux concentrations differing from the one series of flux concentrations and associated with the series of transmitted signal flux areas, indicator reading transducing means adapted to detect changes in the character of the indicator fluxes, intelligence transducing means adapted to be enabled by the said detected changes in the indicator fluxes to record incoming signals on the intelligence track and to transmit outgoing signals from the intelligence track, and means to provide for the recording of incoming signals in the leading area of the series of areas reserved for transmitted signal flux areas and to provide for the transmission of signals from the leading area of the series of areas reserved for received signals, said means comprising recording delay transducing means for writing a signal flux in a magnetizable delay track arrangement on the record member when the intelligence transducing arrangement is enabled, reading delay transducing means for reading the delay signal after the record has moved a delay distance, indicator writing transducer means located a distance from the indicator reading transducing means equal to the delay distance, means connecting the delay reading and indicator writing transducing means for writing a flux in the indicator track at a position identifiable with the previously used intelligence track area to change the character of the indicator flux at that point, whereby the reading indicator transducing means will detect a change in the character of the indicator flux concentrations between the said series of fluxes in the indicator track on a subsequent cycle of travel of the record to enable the recording and transmitting transducer means associated with the intelligence track, whereby on successive cycles of travel of the record member the intelligence transducing means will be enabled for operation at successive areas of the message track.

6. In magnetic apparatus, a continuous record member, an array of magnetic transducer devices, said devices being positioned in operative proximity to the record member, means for moving the record member relative to the transducer devices to cyclically pass the transducer devices so that continuous tracks are swept out by the devices over the surface of the record, said track areas of the record comprising magnetizable material, means comprising a part of the array of transducing devices adapted for operation in conjunction with an intelligence track for recording and transmitting intelligence pulses into and from the record member, said intelligence pulses being entered in successive areas of the intelligence track, and means for enabling the intelligence transducers for operation when the latter are at the area of the intelligence track adjacent the area where the said transducers were enabled during a previous cycle of travel of the record, said enabling means being a portion of the said array and comprising indicator recording transducer devices adapted for operation over an indicator track on the record member, said indicator track being adapted to contain indicator areas corresponding to intelligence areas of the intelligence track, the indicator recording transducers being arranged to induce one character of flux in indicator areas corresponding to freshly recorded intelligence areas and another character flux in indicator areas corresponding to transmitted intelligence areas as the areas of the intelligence track change their status on operation of the intelligence transducers, and means including indicator reading transducers of the transducer array adapted to detect the change of flux in the indicator areas and upon such detection to enable the intelligence transducers for operation.

7. In apparatus for relaying intelligence pulses by means of a continuously revolving magnetizable member, transducing apparatus adapted for operation in conjunction with intelligence, indicator and delay tracks on the member, and means for recording successive pulses in sequence on the intelligence track and transmitting the pulses in the said incoming sequence, said means comprising transducer means for inducing in the indicator track pulses of one polarity to indicate freshly recorded intelligence in associated areas of the intelligence track and pulses of a different polarity to indicate transmitted intelligence in associated areas of the intelligence track, other indicator transducer means for reading a change in the indicator track from one polarity to a different polarity in successive areas, and circuit means for causing the change signal to enable transducing operation in the intelligence track and also in the delay track, and means including transducer means adapted to subsequently read from the delay track to change the polarity in the indicator track opposite the last used intelligence area.

8. In apparatus comprising a continuous magnetizable record member adapted to contain intelligence areas, means to cyclically move the record member, means to locate immediately adjacent intelligence areas on subsequent cycles of travel of the record member, said means comprising transducing means to establish indicating areas on the record member, the indicating areas being of one character when related to intelligence areas reserved for recording intelligence and being of a different character when relating to intelligence areas reserved for transmitted intelligence, means to alter the character of the indicating areas when the identity of the intelligence areas is changed, said altering means comprising transducer means for writing in a delay apparatus and other transducer means for reading from the said delay apparatus and simultaneously writing in the said indicator track to change the character of the flux in the indicator track opposite the last used intelligence arrangement.

9. In magnetic apparatus, means for relaying telegraphic messages, said means including a movable magnetizable record member, means to cyclically move the record member, a distributor adapted for connection to an incoming line, holding circuits connected to the distributor means and adapted to receive and retain possible signals from the distributor, gate circuits connected to the holding circuits, and writing transducer means placed in operative proximity to the surface of the record member and connected to the gate circuits, indicating transducers arranged to sweep out an indicator track on the surface of the record member, said transducers being in operative proximity to the said surface, delay transducers also in operative proximity to the surface and located to sweep out a delay track over the surface, the indicator track being adapted to contain fluxes of one polarity to indicate areas of intelligence tracks swept out by the intelligence writing transducers wherein freshly recorded intelligence characters are stored and to contain indicating fluxes of an opposite polarity to indicate signals which have been recorded in the intelligence track but subsequently removed, means including amplifier-discriminator means for reading a change in the indicator track from one polarity to the opposite polarity, the output of the amplifier-discriminator means being connected to open the gate circuits and to simultaneously insert a delay signal in the delay track, means including delay reading transducers to read the delay signal after the record member has revolved a delay distance and to write in the indicator track to alter the polarity of the indicator signal associated with the area of the intelligence track which was just previously used, and second indicator reading transducers adapted to read a change in polarity of the indicator fluxes from the said other polarity to the said one polarity to indicate the signal of the intelligence track which is to be transmitted from the record member, reading transducer means aligned with the intelligence track and adapted to read the signal into transmitter gating circuits, the transmitter indicator-reading transducer adapted to trigger a transmitter-discriminator to open the gating circuits and to simultaneously write in the delay track, reading delay means adapted to read the delay signal after the drum has moved a delay distance, indicator-writing transducers connected to the delay reading transducer through amplifying circuits to change the indicator flux to indicate the reading of the signal in the intelligence track, holding circuits to receive the read signal through the gating circuits, and transmitter-distributor means to collect the signals from the last mentioned holding circuits and to transmit them over an outgoing line.

10. In magnetic apparatus, means to relay telegraphic messages through a continuously revolving magnetizable storage drum, said means including recording and reading intelligence transducing means interconnected with the incoming telegraph line and arranged in operative proximity to the surface of the drum, indicator transducing means, reading delay transducer means, and writing delay transducer means also positioned in operative relationship to the drum, each transducer means being adapted to sweep out associated tracks over the surface of the drum, receiver-distributor means adapted to receive coded message signals over the incoming line, holding circuits adapted to receive the message signals, gating circuits adapted to permit the signals in the holding circuits to be recorded on the magnetic drum by means of the intelligence transducers, the same intelligence transducers being connected to transmitter gating circuits, the transmitter gating circuits being connected to transmitter holding circuits, and a transmitter-distributor adapted to collect the signals from the transmitter holding circuits for transmission over an outgoing line, and means to record the incoming signals in sequence on the surface of the drum and to transmit the signals from the surface of the drum in the in-coming sequence, said means comprising transducer means for inserting in the indicator track signals of one polarity to indicate recorded but non-transmitted signals in the intelligence tracks and signals in the indicator track of opposite polarity to indicate transmitted signals of the intelligence tracks, indicator-reading transducer means adapted to detect a change from one polarity of indicator flux to the other and to trigger a discriminator circuit according to the direction of change of the flux in the indicator track, changes of one direction being adapted to write in the writing delay track, and changes of the opposite direction to write in the reading delay track, reading transducer means in each delay track to read possible delay signal fluxes and to write a flux in the indicator track in areas thereof associated with the areas of the previously used intelligence track to indicate the new status of the particular area in the intelligence track, whereby on subsequent cycles of travel of the drum the reading indicator-transducer opens the gating circuits for a recording operating at the end of the series of freshly recorded signals in the intelligence track and opens the transmitter gating circuits for an intelligence reading operation at the end of the series of transmitted signal fluxes in the intelligence tracks.

11. Apparatus as in claim 9 wherein means comprising flip-flop and gate circuits are adapted to permit an intelligence transducing operation only on each complete cycle of the said distributor means.

12. Apparatus as in claim 10 wherein means comprising flip-flop and gate circuits are adapted to permit an intelligence transducing operation only on each complete cycle of the said distributor means.

13. Apparatus as in claim 9 wherein circuit means comprising the indicator and delay transducer means are adapted to enable entry of a message after the indicator track has become filled with but one character of indicating flux areas.

14. Apparatus as in claim 10 wherein means comprising the indicator and delay transducing means are adapted to enable entry of a message after the indicator track has become filled with but one character of indicating flux areas.

15. In magnetic relaying apparatus, a continuously movable magnetizable record member, means to cyclically move the record member, means including magnetic transducing means positioned in operative relation to the magnetizable surface of the record member for recording on and reading from intelligence tracks on the member, means including additional magnetic transducing means for enabling the first mentioned transducing means to record an incoming message in incoming sequence in cells along the record member and to read the message cells in said incoming sequence, receiving means connected with the first mentioned transducing means to deliver the message characters to the recording transducer means, and transmitting means connected with the said first mentioned transducing means for removing the message characters from the record member.

16. In magnetic relaying apparatus, an incoming distributor adapted for connection to an incoming line, means including the incoming distributor for holding signals received in the said distributor, continuously movable magnetic storage means, means to cyclically move the record member, transducer means connected with the signal holding means and positioned in operative relation to the storage means for recording the said signals on the storage means at a predetermined time, means including other transducer means for recording and reading successive signals in incoming sequence on and from the storage means by means of the first mentioned transducing means, and transmitting gating and distributor means for transmitting the signals over an outgoing line at predetermined times.

17. Apparatus as in claim 7 and including a plurality of intelligence tracks, and with an intelligence transducing apparatus for each intelligence track.

18. Apparatus as in claim 17 and further including receiving and transmitting distributor means and holding circuit means connected with the intelligence transducers, said distributor and holding means being adapted to distribute and retain spaced signal pulses from an incoming line pending recordation of the said signals on the magnetizable member, and to subsequently transmit the recorded signals.

ARNOLD A. COHEN.
JOHN L. HILL.
ROBERT M. KALB.

REFERENCES CITED

The following references are of record in the file of this patent:

UNITED STATES PATENTS

| Number | Name | Date |
|---|---|---|
| 2,131,322 | Higgitt et al. | Sept. 27, 1938 |
| 2,391,469 | Marshall | Dec. 25, 1945 |
| 2,416,445 | Jensen | Feb. 25, 1947 |
| 2,431,646 | Kenney et al. | Nov. 25, 1947 |
| 2,504,997 | Mason | Apr. 25, 1950 |
| 2,564,403 | May | Aug. 14, 1951 |
| 2,587,532 | Schmidt | Feb. 26, 1952 |
| 2,594,731 | Connolly | Apr. 29, 1952 |